US007332869B2

(12) United States Patent
Yoo et al.

(10) Patent No.: US 7,332,869 B2
(45) Date of Patent: Feb. 19, 2008

(54) POWER SUPPLY APPARATUS, BACKLIGHT ASSEMBLY AND LIQUID CRYSTAL DISPLAY APPARATUS HAVING THE SAME

(75) Inventors: Hyeong-Suk Yoo, Yongin-si (KR); Moon-Shik Kang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 226 days.

(21) Appl. No.: 10/537,410

(22) PCT Filed: Nov. 28, 2003

(86) PCT No.: PCT/KR03/02603

§ 371 (c)(1),
(2), (4) Date: Dec. 7, 2005

(87) PCT Pub. No.: WO2004/051829

PCT Pub. Date: Jun. 17, 2004

(65) Prior Publication Data

US 2006/0139013 A1    Jun. 29, 2006

(30) Foreign Application Priority Data

Dec. 2, 2002    (KR)    ...................... 10-2002-0075819

(51) Int. Cl.
*H05B 37/02*    (2006.01)

(52) U.S. Cl. ...................... 315/224; 315/276; 315/307

(58) Field of Classification Search ............. 315/169.3, 315/224, 276, 307, DIG. 4, DIG. 5
See application file for complete search history.

(56) References Cited

U.S. PATENT DOCUMENTS

| 6,969,958 | B2 * | 11/2005 | Henry | ........................ 315/291 |
| 7,030,569 | B2 * | 4/2006 | Gray | .......................... 315/224 |

FOREIGN PATENT DOCUMENTS

| JP | 08-202276 | 8/1996 |
| JP | 09-073989 | 3/1997 |
| JP | 2000-294390 | 10/2000 |

* cited by examiner

*Primary Examiner*—David H. Vu
(74) *Attorney, Agent, or Firm*—Cantor Colburn LLP (57) ABSTRACT

A power supply apparatus includes an inverter controller, a power transforming part and a connecting part. The power transforming part converts a direct current supplied from the inverter controller into an alternating current to output first and second polarity currents. The connecting part outputs the first and second polarity currents to first and second end portions of a load through first and second terminals, respectively and has a third terminal to receive a sensed signal in response to the first or second polarity currents so as to output the sensed signal. The first terminal is spaced apart from the second terminal by a first insulating distance, and the third terminal is spaced apart from the first or second terminals adjacent to the third terminal by a second insulating distance. Therefore, the sensed signal is independent of the output power, thereby increasing the sensing efficiency.

25 Claims, 6 Drawing Sheets

POWER SUPPLY APPARATUS, BACKLIGHT ASSEMBLY AND LIQUID CRYSTAL DISPLAY APPARATUS HAVING THE SAME

TECHNICAL FIELD

The present invention relates to a power supply apparatus, a backlight assembly and a liquid crystal display (hereinafter, referred to as LCD) apparatus having the same, and more particularly to a power supply apparatus capable of improving sensing efficiency of an output power, a backlight assembly and an LCD apparatus having the same.

BACKGROUND ART

An LCD apparatus, generally, is a light receiving type display apparatus that displays an image using the light that is provided from an exterior. Therefore, the LCD apparatus needs a backlight assembly that provides the LCD apparatus with the light. The LCD apparatus is disposed on a rear of the backlight assembly.

The backlight assembly has various characteristics, for example, such as high luminance, high efficiency, uniform luminance, long lifetime, thin thickness, light weight and low cost and so on. For example, a backlight assembly applied to an LCD apparatus for a notebook computer requires a lamp having a long lifetime and low power consumption. A backlight assembly applied to an LCD apparatus for a monitor or a television receiver requires a lamp having high luminance.

Especially, the backlight assembly applied to the LCD apparatus for the television requires a lamp having higher luminance and longer lifetime than those of the backlight assembly applied to the LCD apparatus for the monitor or the notebook computer. For a display apparatus such as the television receiver, an external electrode fluorescent lamp (EEFL) has been developed because a conventional cold cathode fluorescent lamp (CCFL) may not satisfy specific conditions required for the LCD apparatus for the television receiver. The lamp for the LCD apparatus for the television receiver may be divided into the EEFL having external electrodes outwardly located at both ends thereof and an external/internal electrode fluorescent lamp (EIFL) having one external electrode outwardly located at a first end portion and one internal electrode inwardly located at a second end portion opposite to the first end portion.

For those purposes, an inverter that may drive a plurality of lamps in parallel has been developed. When driving the lamps in parallel, a separate feedback unit is necessary to the lamps so as to prevent fire of the lamp and deterioration of display quality.

As aforementioned, a power supply apparatus having high quality is necessary to the lamps of the LCD apparatus.

DISCLOSURE OF THE INVENTION

The present invention provides a power supply apparatus capable of improving sensing efficiency of an output power having high quality.

The present invention also provides a backlight assembly having the above power supply apparatus.

The present invention also provides an LCD apparatus having the above power supply apparatus.

The power supply apparatus in accordance with one exemplary embodiment of the present invention includes an inverter controller, a power transforming part and a connecting part The inverter controller outputs a direct current that is provided from an exterior in response to a predetermined control signal. The power converter converts the direct current into an alternating current, and transforms voltage of the alternating current to output first and second polarity currents. The connecting part outputs the first polarity current into a first end portion of a load through a first terminal and outputs the second polarity current into a second end portion of the load through a second terminal. The connecting part also receives a sensed signal in accordance with the first or second polarity current through a third terminal to output the signal. The first terminal is spaced apart from the second terminal by a first insulating distance, and the third terminal is spaced apart from the first or second terminal adjacent to the third terminal by a second insulating distance.

The backlight assembly in accordance with one exemplary embodiment of the present invention includes a lamp driving part, a light emitting part, an inverter controller, a power transforming part and a connecting part. The lamp driving part converts a direct current that is provided from an exterior into an alternating current, and transforms voltage of the alternating current to output the alternating current The light emitting part includes a lamp having at least one end portion, to which high voltage alternating current is applied in response to the alternating current, thereby generating a light. The inverter controller has a light controlling part, which increases luminance of the light, and responds to a predetermined control signal to output a direct current that is provided from an exterior to the inverter controller. The power transforming part converts the direct current into an alternating current, and transforms voltage of the alternating current to output first and second polarity currents. The connecting part outputs the first polarity current into a first end portion of a lamp through a first terminal, and outputs the second polarity current into a second end portion of the lamp through a second terminal. The connecting part also receives a sensed signal in accordance with the first and second polarity currents through a third terminal to output the signal. The first terminal is spaced apart from the second terminal by a first insulating distance, and the third terminal is spaced apart from the first or second terminal adjacent to the third terminal by a second insulating distance.

The LCD apparatus in accordance with one exemplary embodiment of the present invention includes a backlight assembly, an inverter controller, a power transforming part and a connecting part.

The backlight assembly includes a lamp driving part, a light emitting part and a light controller. The lamp driving part converts the externally provided direct current into an alternating current, and transforms a voltage of the alternating current to output the alternating current. The light emitting part includes a lamp unit having a plurality of lamps connected in parallel so as to emit a light by means of the transformed alternating current. The light controller increases the luminance of the light from the light emitting part.

The inverter controller disposed on the light controller includes a display unit, and the inverter controller outputs an externally provided direct current to the power transforming part in response to a predetermined control signal. The display unit receives the light from the light emitting part through the light controller to display an image.

The power transforming part converts the direct current into an alternating current, and transforms a voltage of the alternating current to output first and second polarity currents.

The connecting part provides the first and second polarity currents to end portions of the lamp through first and second terminals, respectively. The connecting part outputs the sensed signal in accordance with the first or second polarity current through a third terminal. The first terminal is spaced apart from the second terminal by a first insulating distance. The third terminal is spaced apart from the first or second terminal adjacent thereto by a second insulating distance.

Therefore, the terminals that receives the signal of power supply level supplied from the power supply apparatus is integrally formed with the power supply apparatus, and a distance between the end portions of the transformer and a distance between the end portion of the transformer and the terminal are greater than a distance necessary to insulate, thereby increasing sensing efficiency in accordance with the power supply level.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Figure 1:
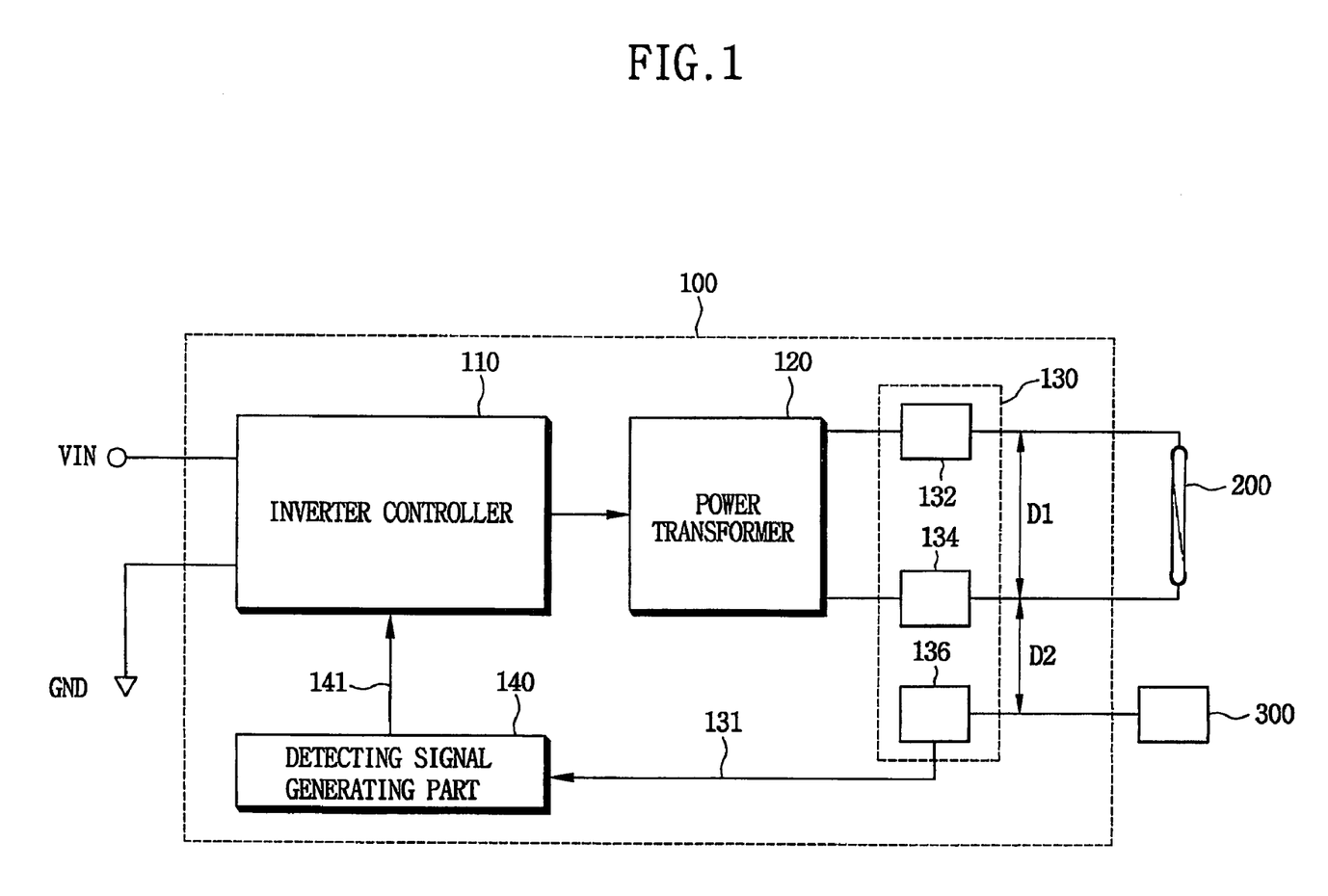
FIG. 1 is a block diagram showing a power supply apparatus according to an exemplary embodiment of the present invention.
Figure 2:
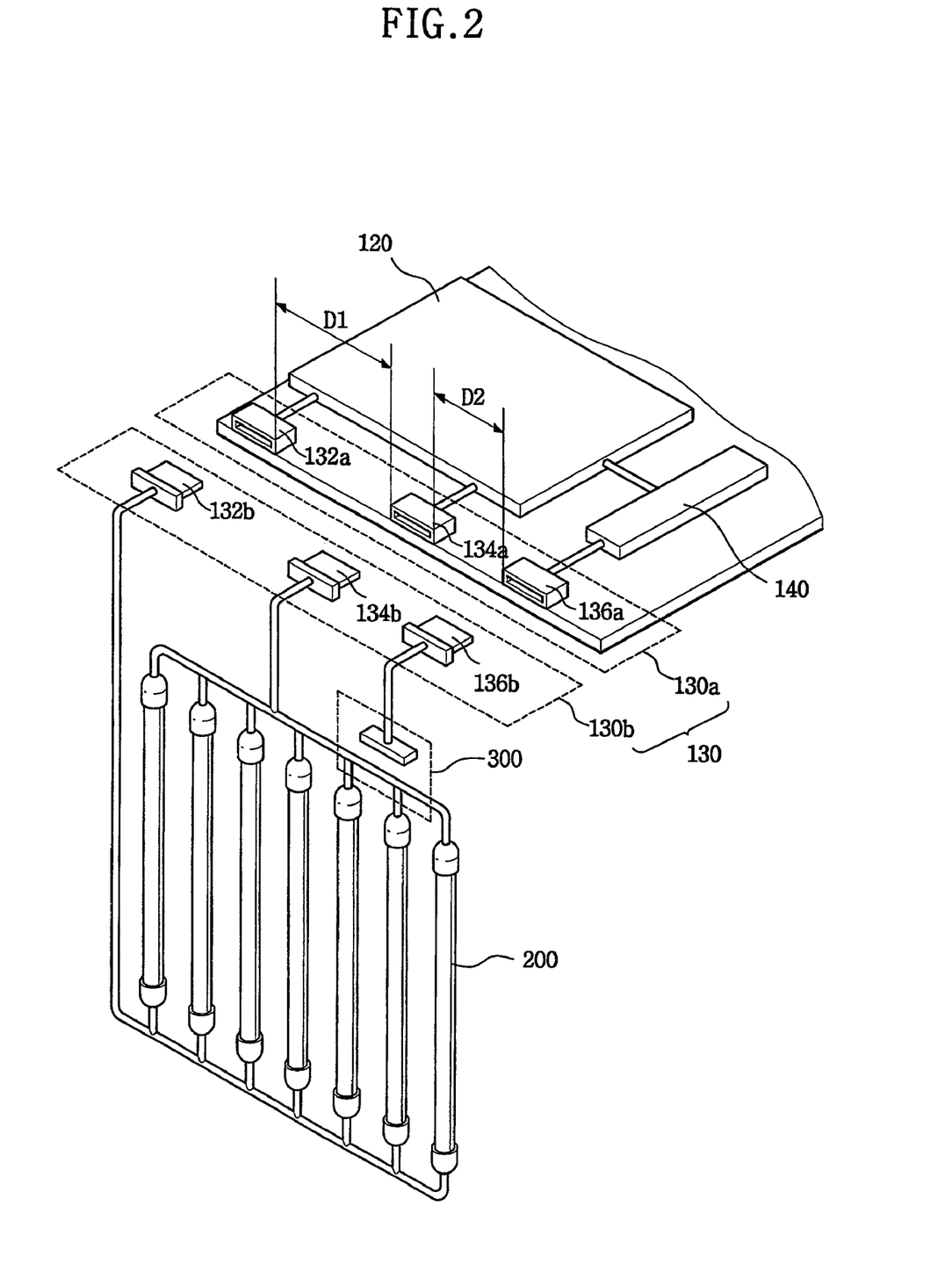
FIG. 2 is a perspective view showing the power supply apparatus shown in FIG. 1.

FIG. 1 is a block diagram showing a power supply apparatus according to an exemplary embodiment of the present invention, and FIG. 2 is a perspective view showing the power supply apparatus shown in FIG. 1. In this exemplary embodiment, a power supply apparatus mounted on a printed circuit board (PCB) will be described.

Referring to FIGS. 1 and 2, a power supply apparatus 100 includes an inverter controller 110, a power transforming part 120, a connecting part 130 and a detecting signal generating part 140. The power supply apparatus 100 supplies an externally provided power to a load part that is a lamp 200. The power supply apparatus 100 receives a feedback of the power supplied to the lamp 200 and sensed by a power sensor 300. The power supply apparatus 100 lowers a voltage level of the power supplied to the lamp when the sensed power is higher than a predetermined level, and raises the voltage level of the power supplied to the lamp when the sensed power is lower than the predetermined level.

Preferably, the power supply apparatus 100 is mounted on one PCB, so that a first terminal 132 outputting an alternating current supplied from the power transforming part 120 is spaced apart from a second terminal 134 by a predetermined distance d1, and a third terminal 136 is spaced apart from the first or second terminals 132 and 134 by a predetermined distance d2. The third terminal 136 receives a feedback signal from the power sensor 300 sensing an output power applied to the lamp 200. Thus, the first, second and third terminals 132, 134 and 136 are formed on a PCB, thereby increasing a sensing efficiency.

The inverter controller 110 provides the power transforming part 120 with a direct current (VIN) that is provided from an exterior, in response to a control signal 141 provided from a detecting signal generating part 140.

The power transforming part 120 converts the direct current (VIN) output from the inverter controller 110 into an alternating current, and transforms voltage of the alternating current so as to output the alternating current to the lamp 200 through the first and second terminals 132 and 134.

Referring to FIG. 2, the connecting part 130 includes first and second connecting parts 130a and 130b. The first connecting part 130a is integrally formed with the power supply apparatus 100. The second connecting part 130b is connected to a power supplying line connected to a hot electrical terminal of the lamp 200 and a power supplying line connected to a cold electrical terminal of the lamp 200 connected to each other in parallel. When the first connecting part 130a has a socket type, the second connecting part 130b has a plug type. The first connecting part 130a includes a first socket 132a connected to a first end portion of the power transforming part 120, a second socket 134a connected to a second end portion of the power transforming part 120, and a third socket 136a connected to the detecting signal generating part 140. The second connecting part 130b includes a first plug 132b inserted into the first socket 132a, a second plug 134b inserted into the second socket 134a, and a third plug 136b connected to the power sensor 300. The first terminal 132 includes the first socket 132a coupled to the first plug 132b, the second terminal 134 includes the second socket 134a coupled to the second plug 134b, and the third terminal 136 includes the third 136a coupled to the third plug 136b.

Preferably, the first terminal 132 is spaced apart from the second terminal 134 by a first insulating distance d1 determined by a safety standard, and the second terminal 134 is spaced apart from the third terminal 136 by a second insulating distance d2 determined by the safety standard. The insulating distance may be a distance between outer surfaces of the sockets. The insulating distance may also be a distance between a wiring disposed between the first socket 132a and the power transforming part 120 and another wiring disposed between the second socket 134a and the power transforming part 120. The insulating distance may also be a distance between the wiring disposed between the second socket 134a and the power transforming part 120 and another wiring disposed between the third socket 136a and the detecting signal generating part 140.

When an UL1950 is adopted as the safety standard and the alternating current supplied from the power transforming part 120 is 1 kV, the first insulating distance d1 is no less than about 2.1 mm.

For example, when a voltage required from a conventional EEFL is about ±750 volts, a potential difference between the first and second ends of a voltage of an alternating current output from the power transforming part 120 is about 1,500 volts. That is, when a level of an alternating current supplied from the power transforming part 120 is no less than 1,000V, the first insulating distance d1 is no less than about 3 mm and the second insulating distance d2 is no less than about 2 mm.

The power sensor 300 sensing variations of the alternating current is disposed adjacent to the power supplying line connected to an end portion of the lamp 200. The power sensor 300 senses variations of the alternating current, and provides the sensed signal 131 to a detecting signal generating part 140 through the third terminal 136.

In order to provide a constant current to the lamp 200, the detecting signal generating part 140 receives the signal 131 from the power sensor 300 through the third terminal 136, which indicates the variation of the alternating current output from the power transforming part 120. The detecting signal generating part 140 compares the signal 131 with a predetermined reference signal to generate a detecting signal 141, and provides the generated signal 141 to the inverter controller 110 as a control signal.

The first, second and third terminals 132, 134 and 136 of the power transforming part 120 are integrally formed with the power supply apparatus 100, thereby increasing the sensing efficiency. The power transforming part 120 of the power supply apparatus 100 generates first and second polarity currents. The third terminal 136 receives the sensed signal 131 generated from the power sensor 300, which senses the power applied to the lamp 200. That is, the first, second and third terminals 132, 134 and 136 are integrally formed with an inverter PCB. In this exemplary embodiment, the first insulating distance d1 is no less than about 3 mm such that the first and second terminals 132 and 134 are insulated from each other. Also, the second insulating distance d2 is no less than about 2 mm such that the third terminal 136 may be insulated from the first or second terminals 132 and 134.

Figure 3:
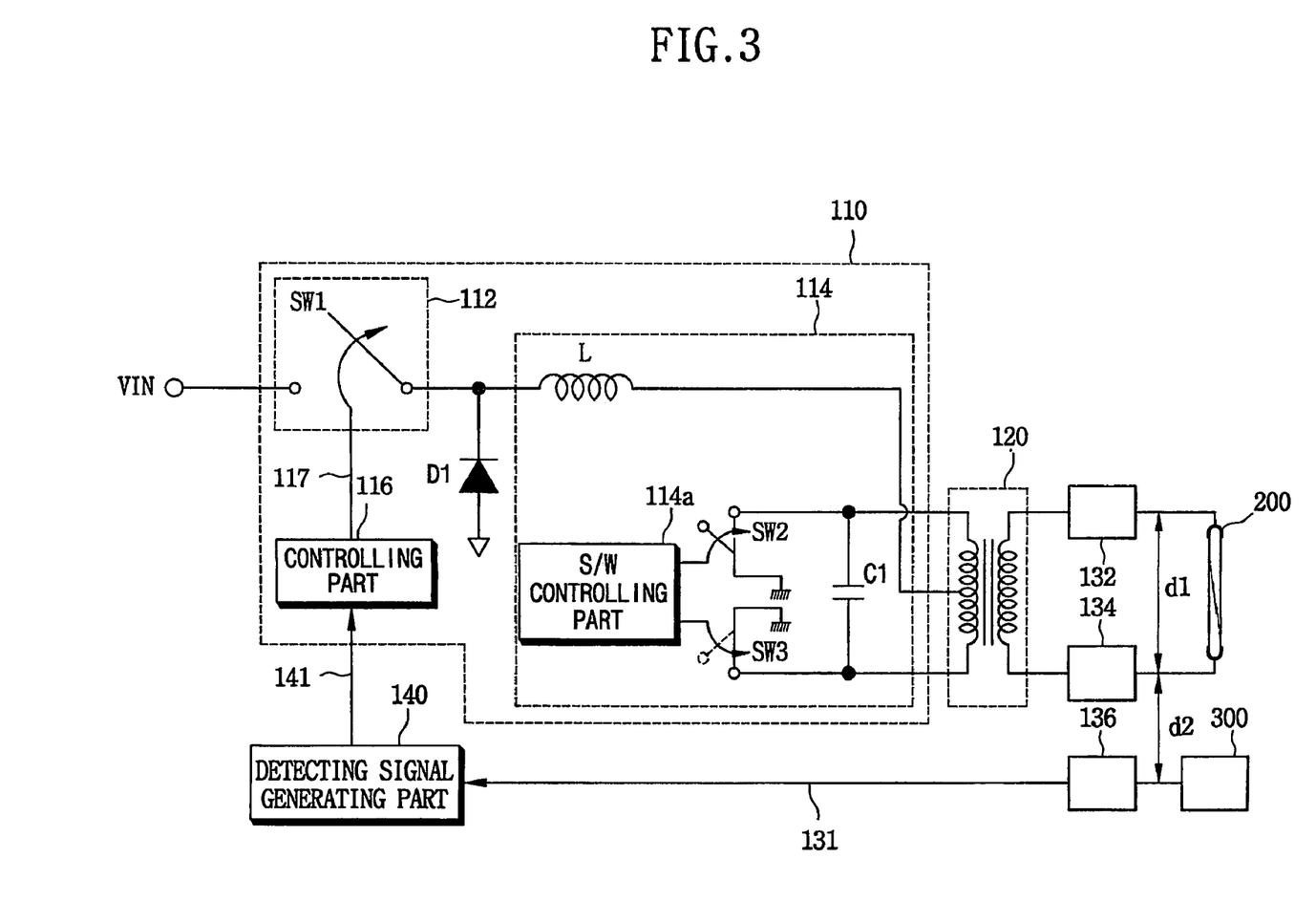
FIG. 3 is a schematic circuit diagram showing the power supply apparatus shown in FIG. 1.

FIG. 3 is a schematic circuit diagram showing the power supply apparatus shown in FIG. 1. In FIG. 3, a lamp driving apparatus will be described as the power supply apparatus.

Referring to FIGS. 1 to 3, the lamp driving apparatus includes a switching part 112 having a first switch SW1, the inverter controller 110 having a diode D1, an inverting part 114 and a controlling part 110, the power transforming part 120 having a transformer, the connecting part 130 and the detecting signal generating part 140. The lamp driving apparatus converts the externally provided direct current into the alternating current, and transforms the voltage of the alternating current so as to provide the transformed alternating current to the lamp 200. The lamp driving apparatus controls the voltage level of the alternating current that is provided to the lamp 200 in response to the sensed signal 131 generated from the power sensor 300. The inverting part 114 includes an inductor L, a capacitor C1, a second switch SW2, a third switch SW3 and a switching controlling part 114a.

The switching part 112 having the first switch SW1 is connected between the power supply (now shown) and the inductor L. The inductor L is connected to a middle tab of the transformer. Therefore, the inductor L controls the direct current (VIN) supplied from an external power supply in response to a switching control of the controlling part 116 to generate the direct current to the inverting part 114 as a pulse shape. The direct current has a voltage level from about 3V to about 30V. The first switch SW1 may include an analogue switch, a bipolar junction transistor (BJT), a field effect transistor (FET), etc.

A first terminal is disposed between the first switch SW1 and the inductor L. The diode D1 is connected between the first terminal and a second terminal that is grounded. A cathode of the diode D1 is connected to an output terminal of the switching part 112, and an anode of the diode D1 is grounded so as to prevent a rush current generated by the inverting part 114 from being supplied to the switching part 112. The capacitor C1 is connected to the power transforming part 120 in parallel. A first terminal of the capacitor C1 is connected to a first terminal of the second switch SW2, and a second terminal of the capacitor C1 is connected to a first terminal of the third switch SW3. Second terminals of the second and third switches SW2 and SW3 are connected to the ground.

The power sensor 300 senses the level of the alternating current provided to the lamp 200, and supplies the sensed signal 131 to the detecting signal generating part 140 through the third terminal 136 of the connecting part 130. The power sensor 300 also senses variations of current and resistance at the output terminal of the transformer. The lamp 200 may include a cold cathode fluorescent lamp (CCFL), an EEFL or an external and internal electrode fluorescent lamp (EIFL). The lamp 200 may include a plurality of the CCFLs, a plurality of the EEFLs or a plurality of the EIFLs.

When the power sensor 300 senses the variation of the voltage, and the power sensor 300 sensing an output voltage is disposed adjacent to a second windings of the transformer, an electric field is generated between the sensor and the second windings so that an induced current flows in the power sensor 300. Therefore, the power sensor 300 senses the variation of the voltage. The power sensor 300 adjacent to the second windings of the transformer may include a noise barrier shielding an electrical noise that is provided from an exterior to the transformer or an electromagnetic interference (EMI) shield.

When a plurality of the lamps is used, a plurality of the power sensors 300 is disposed corresponding to an end portion of each of the lamps, thereby sensing the variation of the voltage. The lamp driving apparatus includes a detecting signal generating part 140. The lamp driving apparatus may include a plurality of the detecting signal generating parts 140.

When the power sensor 300 senses the variation of the current, the power sensor 300 may include a photo diode. Because a voltage signal is easier to control than a current signal, the power sensor 300 converts the current signal to the voltage signal by a resistor having small resistance or a feedback of an amplifier.

The detecting signal generating part 140 compares the voltage level sensed by the power sensor 300 with a predetermined voltage level to generate the detecting signal 141. The detecting signal generating part 140 provides the detecting signal 141 to the controlling part 116 so that the power supply apparatus provides constant current to the lamp 200 by means of the controlling part 116.

The controlling part 116 is connected to the first switch SW1 to generate a switching signal 117 controlling the constant current of the lamp 200 in response to an on/off signal (not shown) and a dimming signal (not shown) that is provided from an exterior to the controlling part 116.

When the first switch SW1 is closed (turned on), the direct current is supplied to the inverting part 114 so that the alternating current is supplied to the load or the lamp. The alternating current may be in a sine wave form. Current flows from a power supply (+V) into the middle tab of the transformer 120 through the inductor L. The switch controlling part 114a controls the second switch SW2 and the third switch SW3 in response to an on/off signal. The second and third switches SW2 and SW3 are alternately turned on and turned off to generate an alternating current wave in the second wiring of the transformer 120. Control frequency of the second and third switches SW2 and SW3 may be constant. Preferably, the control frequencies of the second and third switches SW2 and SW3 are synchronized with a resonant frequency of a reactive part, which is the transformer, of the circuit.

When the second and third switches SW2 and SW3 are synchronized with the resonant frequency of the reactive part of the circuit, the controlling part 116 generates the sine wave. The predetermined operation frequencies of the second and third switches SW2 and SW3 are from about 10 kHz to about 100 kHz. A voltage of the first windings of the power transforming part 120, that is the transformer, is amplified in accordance with a voltage of the second windings of the power transforming part 120 and the windings of the transformer. The voltage of the second windings is greater than a striking voltage of the lamp 200.

The striking voltage of the lamp 200 is independent of length, diameter and packing pressure of the lamp 200, but the striking voltage of the lamp 200 depends on a plurality of lamp parameters except the length, the diameter and the packing pressure of the lamp 200. When the voltage of the second windings of the transformer 120 is greater than the striking voltage, current flows through the lamp 200 to turn on the lamp. The current flowing the lamp 200 may be controlled by means of a ballast inductor (not shown).

When the first switch SW1 is turned off, the alternating current is not supplied to the inverter circuit. However, current charged in the inductor has been supplied from the power supply (+V) to the middle tab of the transformer 120 through the inductor L and the diode D1 until the charged energy is completely exhausted. The first switch SW1 controls the direct current in accordance with the output of the controlling part 116 to control the alternating current supplied to the lamp 200, thereby controlling the luminance of the lamp in accordance with the input from a liquid crystal display LCD apparatus (not shown).

A sensor is disposed adjacent to the output windings of the transformer connected to the end portions of the lamp so as to sense whether or not the constant current is supplied to the lamp through the sensed voltage by the antenna. The sensor may include an antenna.

When the lamp is shut down, the antenna adjacent to the output windings of the transformer does not sense any voltage while the inverter supplies the alternating current to the lamp through the input windings, thereby the output windings of the transformer having no load. Therefore, the current may not be supplied to the lamp.

When the voltage sensed by means of the antenna adjacent to the output windings of the transformer is no more than a predetermined critical voltage, one of the lamps is shut down. Therefore, an alternating current having decreased voltage may be supplied to the inverting part by means of the switch.

The voltage for the initial driving of the lamp is higher than the voltage for the normal driving of the lamp so that an alternating current having higher voltage is supplied to the lamp in an initial driving, and an alternating current having lower voltage is supplied to the lamp in a normal driving, thereby reducing power consumption.

Figure 4:
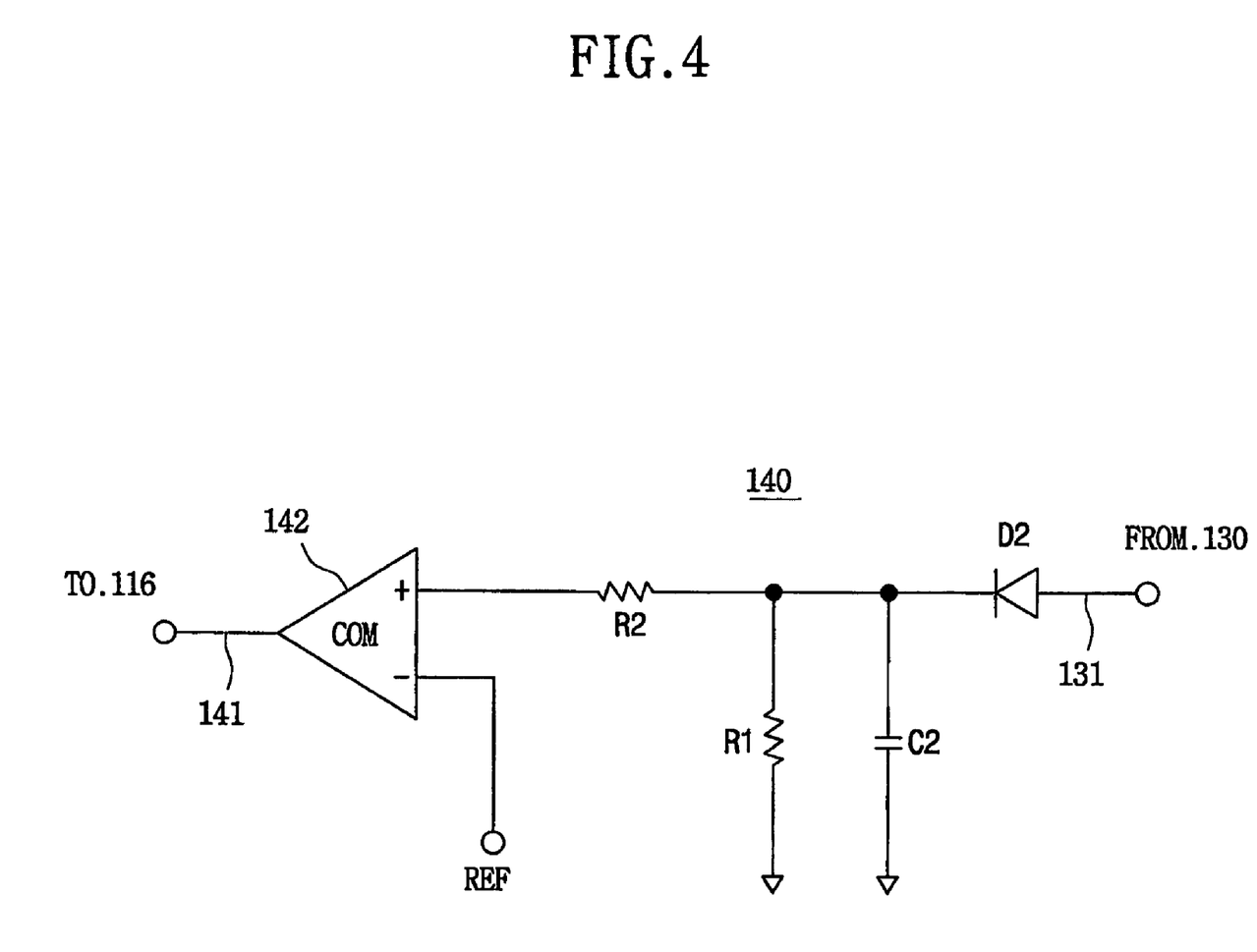
FIG. 4 is a schematic circuit diagram showing a detecting signal generating part shown in FIG. 3.

FIG. 4 is a schematic diagram showing a detecting signal generating part shown in FIG. 3.

Referring to FIGS. 3 and 4, the detecting signal generating part 140 includes a second diode D2, a second capacitor C3, a first resistor R1, a second resistor R2 and a comparator 142.

A level of a signal 131 sensed by the power sensor 300 connected to the second windings of the transformer 120 is decreased by the second diode D2, the second capacitor C2 connected to the second diode D2, the first resistor R1 and the second resistor R2. The signal 131 having the decreased level is supplied to a first input end portion (+) of the comparator 142 so that the signal 131 is compared with a predetermined signal supplied to a second input end portion (−) to generate the detecting signal 141. The generated detecting signal 141 is then supplied to the controlling part 116.

The controlling part 116 having the detecting signal 141 controls on/off of the first switch SW1 controlling the direct current that is provided from an exterior to the controlling part 116.

Figure 5:
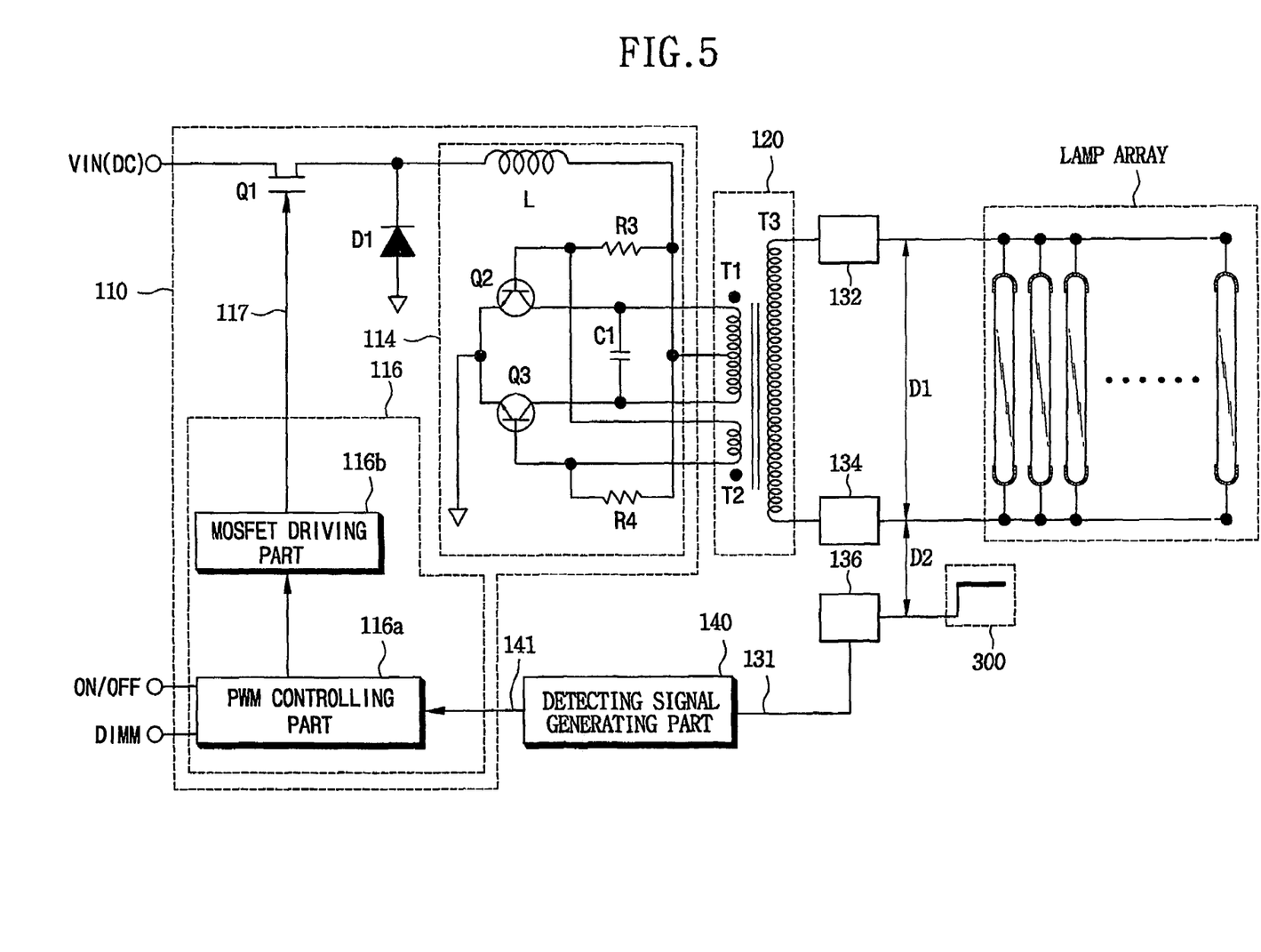
FIG. 5 is a schematic circuit diagram showing a lamp driving part of a backlight assembly according to an exemplary embodiment of the present invention.

FIG. 5 is a schematic diagram showing a lamp driving part of a backlight assembly according to an exemplary embodiment of the present invention.

Referring to FIG. 5, the lamp driving apparatus of the backlight assembly includes the inverter controller 110, the power transforming part 120, the power sensor 300 and the detecting signal generating part 140. The inverter controller 110 has a power transistor Q1, the diode D1, the inverting part 114 and the controlling part 116. The power transforming part 120 has the transformer. The power sensor 300 is disposed adjacent to the output end portion of the transformer. The lamp driving apparatus converts the externally provided direct current into the alternating current, thereby supplying the alternating current to a lamp array. The lamp array has a plurality of EEFLs connected to each other in parallel.

The lamp array may also include a plurality of external and internal electrode fluorescent lamps (EIFLs). The ballast capacitor may be connected to one end portion or two end portions of the lamps.

The power transistor Q1 is turned on in response to a switching signal 117 output from the controlling part 116 through a gate to control the direct current output from a source thereof into the inverting part 114 through a drain thereof.

A cathode of the diode D1 is connected to the drain of the power transistor Q1, and an anode of the diode D1 is grounded to prevent a rush current of the inverting part 114 from being supplied to the power transistor Q1.

The inverting part 114 includes the inductor L, a resonant capacitor C1, a third resistor R3, a fourth resistor R4, a second transistor Q2 and a third transistor Q3. An end portion of the inverting part 114 is connected to the drain of the power transistor Q1 to transform an intermittent direct current supplied from the power transistor Q1 to a first alternating current. The inverting part 114 transforms voltage of the first alternating current to generate a second alternating current, thereby supplying the second alternating current to the power transforming part 120. The inverter includes a resonant Royer inverter circuit.

In particular, a first end portion of the inductor L is connected to the drain of the power transistor Q1 to remove impulse signal from the direct current, thereby outputting the direct current without the impulse signal through a second end portion of the inductor L. When the power transistor Q1 is turned on, the inductor L charges energy. When the power transistor Q1 is turned off, the inductor L supplies counter electromotive force to the diode. Therefore, the inductor L stabilizes current as a switching regulator.

The transformer of the power transforming part 120 includes the first windings having a first winding T1 and a second winding T2 and the second windings having a third winding T3. The transformer outputs the alternating current provided to the first winding T1 through the inductor L of the inverting part 114 to the third winding T3 of the second windings by means of electromagnetic induction, thereby generating a high voltage. The high voltage is supplied to a lamp array. The direct current is supplied from the inductor L to the first winding T1 through the middle tab.

The second winding T2 turns on one of the second transistor Q2 and the third transistor Q3 in accordance with the alternating current provided to the first winding T1.

The resonant capacitor C1 is connected to end portions of the first winding T1 of the transformer to form an LC resonant circuit with the inductance signal of the first winding T1. The second winding T2 connected to the input end portion of the transformer turns on one of the second transistor Q2 and the third transistor Q3.

A direct current is applied to a base of the second transistor Q2 through the third resistor R3, and a collector of the second transistor Q2 is connected to a first end portion of the resonant capacitor C1 and the first winding T1 in parallel to control the power transforming part 120. The direct current is applied to a base of the third transistor Q3 through the fourth resistor R4, and a collector of the third transistor Q3 is connected to a second end portion of the resonant capacitor C1 and the first winding T1 in parallel to control the power transforming part 120. Emitters of the second and third transistors Q2 and Q3 are grounded.

The power sensor 300 includes an antenna 310 spaced apart from the output end portion of the transformer 120 by a minimum insulating distance. The output end portion of the transformer is a wire through which the alternating current from the third winding T3 is supplied to the lamp. The minimum insulating distance is the second insulating distance. The power sensor 300 senses the voltage of the wire to provide the sensed signal to the detecting signal generating part 140. When the antenna 310 is disposed adjacent to the second windings of the transformer, electric field is formed between the antenna 310 and the wire connected to the output portion of the second wirings, thereby sensing the voltage.

When a coil antenna 310 is disposed adjacent to the second windings, another transformer having the second windings and the coil antenna generates a current in accordance with the induced voltage. The current is supplied to the detecting signal generating part 140 to serve as an inverter feedback.

The controlling part 116 includes a pulse width modulation (PWM) controlling part 116a and a metal oxide semiconductor field effect transistor (MOSFET) driving part 116b that is a switch driving part. The controlling part 116 is controlled by means of an on/off signal in response to the dimming signal that is provided from an exterior to the controlling part 116 and the detecting signal provided from the detecting signal generating part 140 to supply the switching signal 117 to the power transistor Q1. The switching signal 117 is used to control the level of the alternating current. The dimming signal controls the luminance of the lamp, and the dimming signal is a digital signal having a predetermined duty. The dimming signal may be generated by a manual input. The signal sensed from the output end portion of the transformer 120 supplying the current having increased voltage to the lamp 200 is compared with a predetermined standard signal to form the detecting signal.

The MOSFET driving part 116b amplifies the signal used to control the level of the alternating current provided from the PWM controlling part 116a, and the MOSFET driving part 116b supplied the signal to the power transistor Q1. The MOSFET driving part 116b is used to amplify a signal having a low level because the signal output from the PWM controlling part 116a generally has a low level and a signal having a higher level is necessary to the power transistor Q1.

Hereinafter, a power output part, that is the inverting part 114 and the power transforming part 120, converting an alternating current having low level to an alternating current having high level will be explained.

The direct current transformed by the power transistor Q1 is applied to the base of the second transistor Q2 through the resistor serially connected to the base of the second transistor Q2. The base of the second transistor Q2 is coupled to the input end portion of the inverting part 114. The first winding T1 having the middle tab of the transformer 120 is connected in parallel between the collectors of the second and third transistors Q2 and Q3. Emitters of the second and third transistors Q2 and Q3 are grounded. The capacitor C1 is also connected in parallel to the first winding T1.

The direct current is supplied to the middle tab of the first winding T1 of the transformer 120 through the inductor L having a choke coil. The choke coil transforms the current supplied from the inverting part 114 to the constant current.

The number of windings of the third winding T3 of the transformer 120 is larger than that of the first winding T1, thereby increasing the voltage supplied to the first winding T1. A plurality of lamps of the lamp array is connected in parallel with the third winding T3 of the transformer 120 to supply the constant voltage to each of the fluorescent lamps. The increased alternating current having the constant voltage may have a positive level and a negative level substantially equal to the positive level. The increased alternating current having the constant voltage may also have a constant interval between a minimum level and a maximum level.

A first end portion of the second winding T2 of the transformer of the power transforming part 120 is connected to the base of the second transistor Q2, and a second end portion of the second winding T2 of the transformer of the power transforming part 120 is connected to the base of the third transistor Q3. The power transforming part 120 provides the voltage supplied from the second winding T2 to the bases of the second and third transistors Q2 and Q3.

The power sensor 300 includes one antenna 310. The power sensor 300 may include a plurality of the antennas connected to the EEFLs. The power sensor 300 is connected to the second windings of the transformer. The lamp driving apparatus may include a plurality of the detecting signal generating parts 140, and the number of the detecting signal generating parts 140 may be equal to the number of the antennas.

Hereinafter, an operation of the inverter transforming the direct current to the alternating current will be explained.

Firstly, when the transformed direct current is supplied to the inverter, the current is supplied to the first winding T1 of the transformer 120 through the inductor L, the pulse current is supplied to the base of the second transistor Q2 through the first resistor R3, the pulse current is supplied to the base of the third transistor Q3 through the second resistor R4. The resonant capacitor C1 resonates in the reactance of the first windings of the transformer of the power transforming part 120. The first windings include the first winding T1. Therefore, the increased voltage is generated between the third winding T3. The voltage is increased in accordance with a turn ratio of the first winding T1 to the third winding T3 of the transformer. A direction of the current of the second winding T2 of the first windings is an opposite direction to the current of the first winding T1.

The voltage is increased in accordance with the turn ratio to generate a high voltage wave, thereby preventing the flickering of the lamp array. The end portions of the third winding T3 of the transformer resonate in accordance with a frequency and a phase of the high voltage wave.

The power supply apparatus includes a plurality of the EEFLs connected in parallel. The power supply apparatus may include a plurality of the EIFLs. The power supply apparatus may also include a plurality of the EEFLs and EIFLs. When the EIFLs are connected in parallel, the inverter may include the external electrodes connected to each other and the internal electrodes connected to each other. However, the external electrodes may be connected to the internal electrodes.

When the EEFLs or the EIFLs are connected in parallel, the alternating current having the current voltage is supplied to two end portions of the fluorescent lamps in response to the dimming signal that is provided from an exterior to the lamps, thereby controlling the luminance of the fluorescent lamps.

When one of the fluorescent lamps connected in parallel is shut down, the load exhausting the power decreases. The decreased power consumption is sensed by means of the antenna connected to the second windings of the transformer so that the direct current is controlled by means of the feedback of the sensed power consumption. Therefore, the constant current is supplied to the lamps. When at least one fluorescent lamp operates normally, a closed loop is formed so that current on a tube flows through the closed loop, thereby preventing a fire.

The backlight assembly senses the power generated from the second windings of the transformer. Hereinafter, an LCD apparatus having the backlight assembly is explained.

Figure 6:
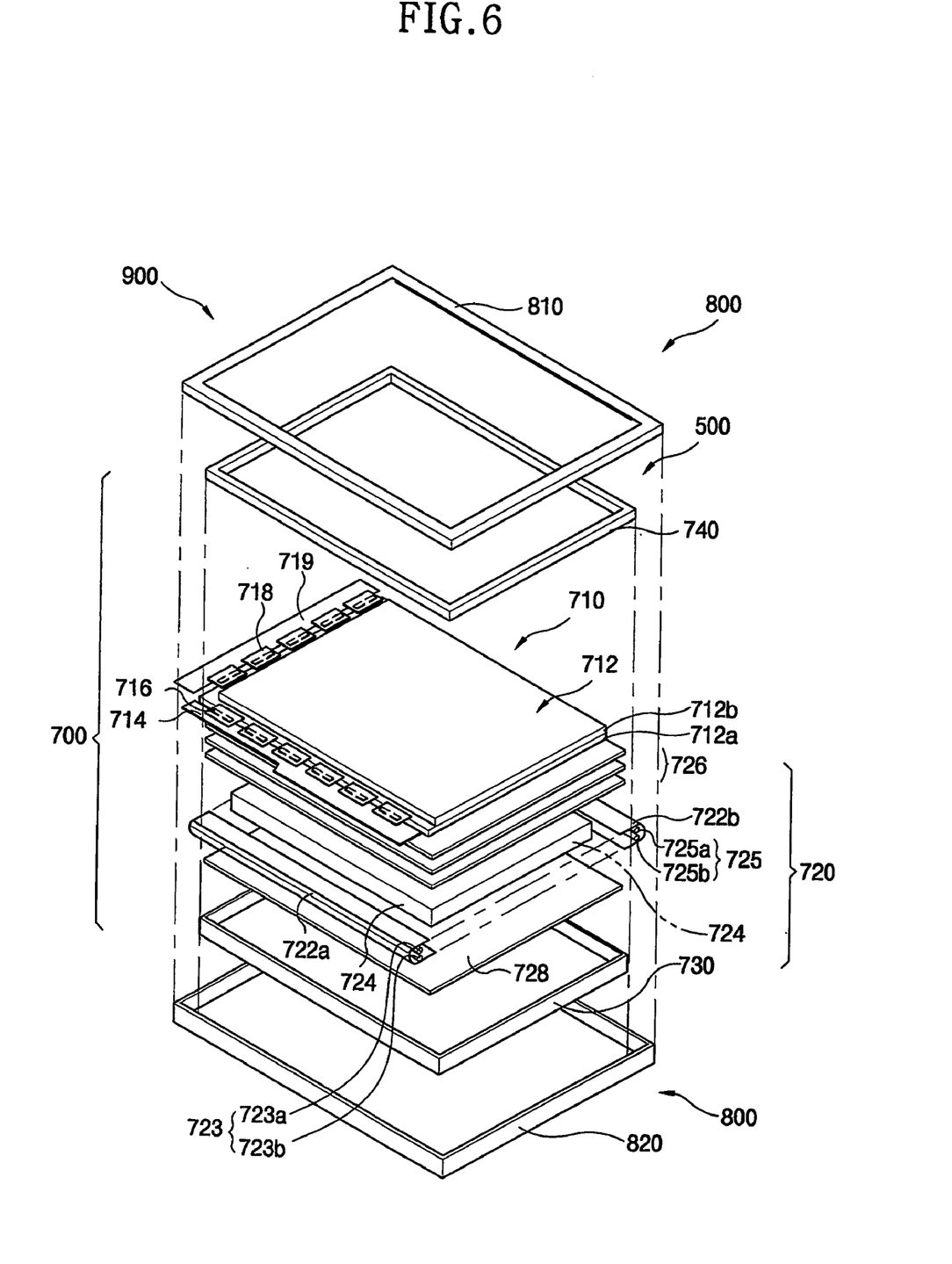
FIG. 6 is an exploded perspective view showing an LCD apparatus according to an exemplary embodiment of the present invention.

FIG. 6 is an exploded perspective view showing an LCD apparatus according to an exemplary embodiment of the present invention. The LCD apparatus has a light source disposed on a side thereof.

The LCD apparatus 900 includes an LCD module 700, a front cover 810 receiving the LCD module 700 and a rear cover 820. An image signal is supplied to the LCD module 700 so that the image is displayed. The LCD module 700 includes a display unit 710 having an LCD panel 712 displaying the image.

The display unit 710 includes the LCD panel 712, a data PCB 714, a gate PCB 719, a data tape carrier package TCP 716 and a gate TCP 718. The LCD panel 712 includes the thin film transistor TFT substrate 712a, a color filter substrate 712b and a liquid crystal layer (not shown), thereby displaying the image.

In particular, the TFT substrate 712a is a transparent glass substrate having a plurality of TFTs arranged in a matrix shape on the transparent glass substrate. Data lines are connected to source electrodes of the TFTs, and gate lines are connected to gate electrodes of the TFTs. A plurality of pixel electrodes having a transparent conductive material such as indium tin oxide ITO, indium zinc oxide IZO, etc. is connected to the drain electrodes.

When electrical signals are supplied to the date lines and the gate lines, the electrical signals are supplied to the source electrode and the gate electrode of each of the TFTs. The TFTs are turned on/off in response to the electrical signal to supply electrical signal necessary to form a pixel to the drain electrode.

The color filter substrate 712b is corresponding to the TFT substrate 712a. The color filter substrate 712b includes a red color filter, a green color filter and a blue color filter. The color filters are formed through depositing and patterning thin films. When a light passes through the color filter substrate 712b, a predetermined color is displayed by the color filters. A common electrode having ITO is formed over the color filter substrate 712b.

When the power is supplied to the gate electrode and the source electrode of each of the transistors of the TFT substrate 712a, an electric field is formed between the pixel electrodes of the TFT substrate 712a and the common electrode of the color filter substrate. The arrangement of the liquid crystal disposed between the TFT substrate 712a and the color filter substrate 714b is varied in response to an electric field applied thereto, and thus a light transmittance thereof is changed, thereby displaying the image.

In order to control a time when the liquid crystal varies the arrangement, a driving signal and a timing signal are supplied to the gate line and the data line of the TFT, respectively. The data TCP 716 disposed on a data portion of the LCD panel 712 controls a time when the data driving signal is supplied. The gate TCP 718 disposed on a gate portion of the LCD panel 712 controls a time when the gate driving signal is supplied. The data TCP 716 and the gate TCP 718 are flexible circuit boards.

The data PCB 714 and the gate PCB 719 are connected to the data TCP 716 in the data portion and the gate TCP 718 in the gate portion, respectively. The image signal is externally provided to the LCD panel 712 so that the data PCB 716 and the gate PCB 719 supply the driving signal to the gate line and the data line.

The data PCB 714 and the gate PCB 719 include the source portion and the gate portion, respectively. The source portion is formed on the data PCB 714, and the source portion supplies an image signal to the LCD panel 712. The image signal is supplied from an external information processing apparatus (not shown) such as a computer. The gate portion supplies the gate driving signal to the gate line of the LCD panel 712.

The data PCB 714 and the gate PCBs 719 generate driving signals of the LCD apparatus such as the gate driving signal, the data signal, the timing signals, etc. Therefore, the data PCB 714 and the gate PCB 719 output the gate and data driving signals to the gate and data lines of the LCD panel 712 through the gate and data TCPs 718 and 716, respectively. The gate driving signal and the data signal are supplied in a predetermined time by means of the timing signals.

A backlight assembly 720 supplying a uniform light to the display unit 710 is disposed under the display unit 710. The backlight assembly 720 includes first and second lamp units 723 and 724 disposed on two sides of an LCD module 700 to generate light. The first lamp unit 723 includes first and second lamps 723a and 723b, and the first lamp unit 723 is covered by a first lamp cover 722a. The second lamp unit 725 includes third and fourth lamps 725a and 725b, and the second lamp unit 725 is covered by a second lamp cover 722b. The LCD apparatus includes the power supply apparatus supplying power to the first to fourth lamps 723a, 723b, 725a and 725b.

A light guide plate 724 has a size corresponding to the LCD panel of the display unit 710. The light guide plate 724 is disposed under the LCD panel 712 to change direction of the light generated by the first and second lamp units 723 and 725, thereby guiding the light into the display unit 710.

The light guide plate 724 has a hexahedron shape having a uniform thickness. The light guide plate 724 may have a wedge shape. The first and second lamp units 723 and 725 are disposed on the sides of the light guide plate 724 facing each other to increase light efficiency. The first and second lamp units 723 and 725 may have a plurality of lamps.

The light that exits from the light guide plate 724 passes through the optical sheets 726 disposed on the light guide plate 724 to generate a light having uniform luminance. A reflecting plate 728 disposed under the light guide plate 724 reflects a leaked light from the reflecting plate 728 into the light guide plate 724 to increase the light efficiency.

A mold frame 730, which is a receiving case, secures the display unit 710 and the backlight assembly 720. The mold frame 730 has a rectangular parallelepiped shape, and the upper face of the mold frame 730 is opened.

The data PCB 714 and the gate PCB 719 of the display unit 710 are folded outwardly, and secured on the undersurface of the mold frame 730 to form a chassis 740. The chassis 740 prevents the display unit 710 from being separated therefrom. A portion of the chassis 740 is open to expose the LCD panel 710. Sidewalls of the chassis 740 are folded inwardly and vertically to secure the LCD panel 710 with the LCD apparatus.

The LCD apparatus includes the light guide plate and a plurality of lamps disposed on the sidewalls of the light guide plate. The LCD apparatus may have a direct illuminating light source.

INDUSTRIAL APPLICABILITY

As mentioned above, end portions of a transformer of a power supply apparatus are spaced apart from each other by an insulating distance, and a terminal receiving a signal from a sensor sensing a power generated by the power supply apparatus is integrally formed with an inverter PCB of the power supply apparatus. Therefore, the sensed signal is independent of the output power, thereby increasing sensing efficiency.

Although the exemplary embodiments of the present invention have been described, it is understood that the present invention should not be limited to these exemplary embodiments but various changes and modifications can be made by one ordinary skilled in the art within the scope of the present invention as hereinafter claimed.

The invention claimed is:

1. A power supply apparatus comprising:
   an inverter controller outputting an externally provided direct current in response to a predetermined control signal;
   a power transforming part converting the direct current into an alternating current, and transforming voltage of the alternating current to output a first polarity current and a second polarity current; and
   a connecting part outputting the first polarity current to a first end portion of a load through a first terminal, the connecting part outputting the second polarity current to a second end portion of the load through a second terminal, and the connecting part having a third terminal to receive a sensed signal in response to the first or second polarity currents so as to output the sensed signal,
   wherein the first terminal is spaced apart from the second terminal by a first insulating distance, and the third terminal is spaced apart from the first or second terminals adjacent to the third terminal by a second insulating distance.

2. The apparatus of claim 1, further comprising a power sensor disposed adjacent to the first or second end portions of the load so as to sense a level of the alternating current applied to the load.

3. The apparatus of claim 1, further comprising a detecting signal generating part comparing the sensed signal output from the third terminal with a predetermined reference signal to generate the control signal, thereby providing the control signal to the inverter controller.

4. The apparatus of claim 1, wherein the first and second insulating distances are no less than 3 mm and 2 mm, respectively.

5. The apparatus of claim 1, wherein the inverter controller, the power transforming part and the connecting part are formed on one substrate.

6. A backlight assembly comprising:
   a lamp driving part converting an externally provided direct current into an alternating current, and transforming voltage of the alternating current to output the alternating current;
   a light emitting part including a lamp having a first end portion to which high voltage alternating current is applied, and generating a light in response to the transformed alternating current; and
   a light controller increasing luminance of the light,
   wherein the lamp driving part includes:
   an inverter controller outputting the externally provided direct current in response to a predetermined control signal;
   a power transforming part converting the direct current into the alternating current, and transforming voltage of the alternating current to output a first polarity current and a second polarity current; and
   a connecting part outputting the first polarity current to a first end portion of a load through a first terminal, the connecting part outputting the second polarity current to a second end portion of the load through a second terminal, and the connecting part having a third terminal to receive a sensed signal in response to the first or second polarity currents so as to output the sensed signal,
   wherein the first terminal is spaced apart from the second terminal by a first insulating distance, and the third terminal is spaced apart from the first or second terminals adjacent to the third terminal by a second insulating distance.

7. The backlight assembly of claim 6, further comprising a power sensor disposed adjacent to the first or second end portions of the lamp so as to sense a level of the alternating current applied to the lamp.

8. The backlight assembly of claim 7, wherein the power sensor includes a coil.

9. The backlight assembly of claim 7, wherein the lamp driving part further comprises a detecting signal generating part comparing a sensed signal from the power sensor with a predetermined reference signal to generate a detecting signal, the detecting signal generating part providing the detecting signal to the inverter controller as a control signal so as to provide a constant current to the lamp.

10. The backlight assembly of claim 9, wherein the power transforming part further comprises a transformer having a first windings and a second windings so as to transform the voltage of the alternating current, and wherein the power sensor sensing a voltage in accordance with an electric field generated in response to a current flowing through the second windings, and providing the sensed voltage to the detecting signal generating part as a sensed signal.

11. The backlight assembly of claim 9, wherein the lamp driving part includes a plurality of the detecting signal generating parts and a plurality of the power sensors, and a number of the detecting signal generating parts is no more than a number of the power sensors.

12. The backlight assembly of claim 7, wherein the lamp includes an EEFL.

13. The backlight assembly of claim 12, wherein the lamp driving part includes a plurality of the EEFLs, and the power sensor is connected to at least one of the EEFLs.

14. The backlight assembly of claim 7, wherein the lamp includes a plurality of the EEFLs connected to each other in parallel.

15. The backlight assembly of claim 7, wherein the power transforming part includes a transformer having a first windings and a second windings so as to transform voltage of the alternating current, and the power sensor is disposed adjacent to the second windings of the transformer.

16. The backlight assembly of claim 6, wherein the power transforming part supplies a constant voltage, of which positive-polarity and negative-polarity levels of the transformed alternating current are substantially equal to each other, to the lamp.

17. The backlight assembly of claim 6, wherein the power output part supplies a constant voltage, of which minimum and maximum levels of the transformed alternating current are substantially equal to each other, to the lamp.

18. The backlight assembly of claim 6, wherein the inverter controller comprises:

a controlling part generating a switching signal to control an output of a constant current applied to the lamp in response to an on/off signal and an externally provided dimming signal;

a switching part turning on or turning off an output of the direct current in response to the switching signal; and an inverting part converting the direct current supplied through the switching part into a first alternating current to supply the first alternating current to the power transforming part.

19. The backlight assembly of claim 18, wherein the inverter controller further comprises a diode having a cathode connected to an output terminal of the switching part and an anode grounded so as to prevent a rush current output from the inverting part from being supplied to the switching part.

20. The backlight assembly of claim 6, wherein the inverter controller further comprises a switch driving part amplifying a signal used to control a level of the alternating current output from the controlling part, and supplying the amplified signal to the switching part.

21. An LCD apparatus comprising:

a backlight assembly including a lamp driving part converting an externally provided direct current into an alternating current, and transforming voltage of the alternating current to output the alternating current, a light emitting part including a lamp having an end portion, to which high voltage alternating current is applied, and generating light in response to the transformed alternating current, and a light controller increasing luminance of the light; and a display unit disposed on the light controller to receive the light from the light emitting part through the light controller, thereby displaying an image, and wherein the lamp driving part includes an inverter controller outputting the externally provided direct current in response to a predetermined control signal;

a power transforming part converting the direct current into the alternating current, and transforming a voltage of the alternating current to output a first polarity current and a second polarity current; and a connecting part outputting the first polarity current to a first end portion of the lamp through a first terminal, the connecting part outputting the second polarity current to a second end portion of the lamp through a second terminal, and the connecting part having a third terminal to receive a sensed signal in response to the first or second polarity currents so as to output the sensed signal, and wherein the first terminal is spaced apart from the second terminal by a first insulating distance, and the third terminal is spaced apart from the first or second terminals adjacent to the third terminal by a second insulating distance.

22. The LCD apparatus of claim 21, wherein the first and second insulating distances are no less than about 3 mm and about 2 mm, respectively.

23. The LCD apparatus of claim 21, wherein the inverter controller, the power transforming part and the connecting part are formed on one substrate.

24. The LCD apparatus of claim 21, further comprising a power sensor disposed adjacent to the first or second end portions of the lamp so as to sense a level of the alternating current applied to the lamp.

25. The LCD apparatus of claim 21, further comprising a detecting signal generating part comparing the sensed signal output from the third terminal with a predetermined reference signal to generate the control signal, thereby providing the control signal to the inverter controller.

* * * * *